(No Model.)

T. D. McCARTY & F. C. SAWHILL.
PIPE WRENCH.

No. 346,299. Patented July 27, 1886.

WITNESSES
F. L. Durand
Edward Stanton

Thomas D. McCarty
Frank C. Sawhill
INVENTORS.

By Louis Bagger & Co.
Attorneys.

UNITED STATES PATENT OFFICE.

THOMAS D. McCARTY AND FRANK C. SAWHILL, OF MIDWAY, PA.

PIPE-WRENCH.

SPECIFICATION forming part of Letters Patent No. 346,299, dated July 27, 1886.

Application filed June 7, 1886. Serial No. 204,357. (No model.)

*To all whom it may concern:*

Be it known that we, THOMAS D. McCARTY and FRANK C. SAWHILL, both residents of Midway, in the county of Washington and State of Pennsylvania, have invented certain new and useful Improvements in Pipe-Tongs; and we do hereby declare that the following is a full, clear, and exact description of the invention, which will enable others skilled in the art to which it appertains to make and use the same, reference being had to the accompanying drawings, which form a part of this specification, and in which—

Figure 1:
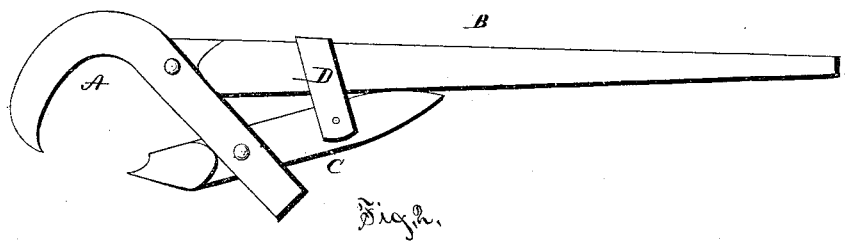
Figure 2:
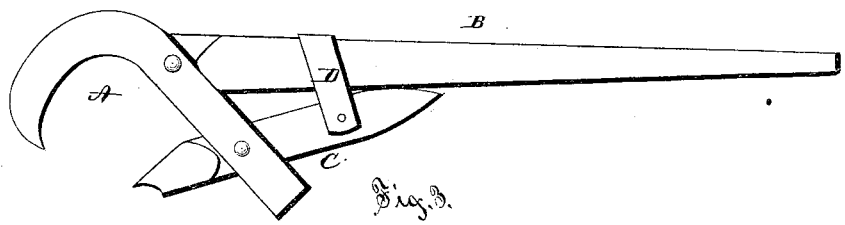
Figure 3:
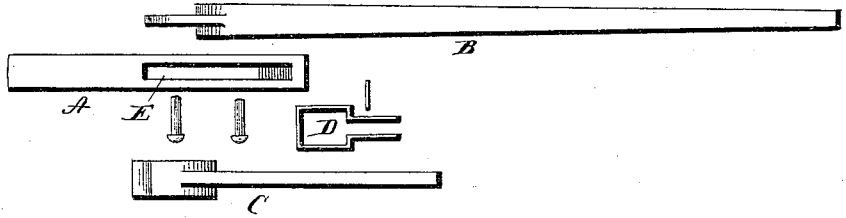
Figure 4:
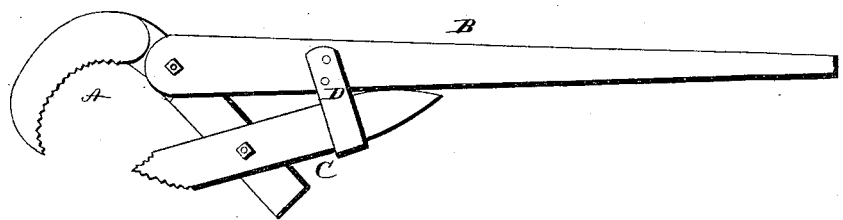
Figure 5:
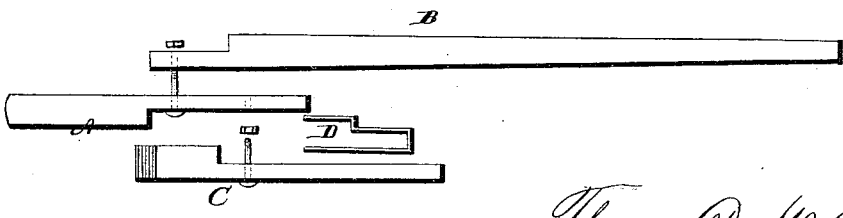

Figure 1 is a side view of our improved pipe-tongs. Fig. 2 is a similar view showing the same adapted for use as an ordinary wrench. Fig. 3 is an edge view of the several unassembled parts. Fig. 4 is a side view of a modified form of our pipe-tongs; and Fig. 5 is an edge view showing the form of the modified parts.

Like letters of reference indicate like parts throughout all the figures.

Our invention has relation to pipe-tongs; and it consists in the improved construction and combination of parts, as will be hereinafter fully described, and pointed out in the claims.

Referring to the accompanying drawings, A represents the hook; B, the handle; C, the lever, and D the guard. The hook has a slot, E, formed through its shank, in the inner end of which is pivoted the reduced end of the handle. In the outer end of said slot is pivoted the lever, which has an enlarged and pointed end, the point being formed by two faces meeting at an angle to each other, one of which faces is flat and the other cylindrically concave. The concave face is the one which is turned toward the hook when the tongs are to be used for holding gas or steam pipes or round bars of iron, the concavity leaving two points, instead of one, for biting into the thing to be held, Figs. 1, 3, and 4. By reversing said lever, as seen in Fig. 2, the flat face is opposed to the broad curve of the hook and a wrench formed, which will adjust itself to nuts of various sizes and shapes. To the outer end of said lever is pivoted the guide, which surounds and slides upon the handle, Figs. 1 and 2. This guide may be made as represented in Figs. 4 and 5, and rigidly attached to the handle, so that the outer end of the lever may slide under it. The outer end of said lever is pointed, the edges being curved toward said point, so that it may adapt itself to bear upon said handle when the hook is in any position.

The faces of the enlarged end of the lever and the inner face of the hook may be fluted, as shown in Fig. 4.

The parts of said tongs may be secured together in the ordinary manner by pivoting the handle and lever upon the side of the shank of the hook, in which case the slot in said shank would be dispensed with, and the reduction of the lever and handle be made upon only one side of each, as seen in Figs. 4 and 5.

One advantage of our pipe-tongs rests in the fact that there is only one handle to grasp in operating the same, and another in the fact that, besides the grip of the lever, there is a binding from the point of the hook directly opposite the rivet connecting said hook to the handle.

Having thus fully described our invention, we claim and desire to secure by Letters Patent of the United States—

1. A pair of pipe-tongs, consisting of a hook, a handle pivoted to the inner end of the shank of said hook, and a lever pivoted to the outer end of said shank, substantially as and for the purpose set forth.

2. In a pair of pipe-tongs, the combination of a hook, a handle pivoted to the inner end of the shank of said hook, a lever pivoted to the outer end of said shank, and a guard pivoted to the outer end of said lever, and adapted to slide upon said handle, substantially as shown and described.

3. In a pair of pipe-tongs, the combination of a hook having a slot in the shank, a handle pivoted by its reduced end in the inner end of said slot, and a lever with an enlarged and pointed end pivoted in the outer end of said slot, substantially as shown and described.

4. In a pair of pipe-tongs, the combination of a hook, a handle, a guard, reversible lever, both ends of which are pointed, the point of the inner end being formed by the junction of a flat face and a cylindrically-concave face, substantially as and for the purpose set forth.

In testimony that we claim the foregoing as our own we have hereunto affixed our signatures in presence of two witnesses.

THOMAS D. McCARTY.
FRANK C. SAWHILL.

Witnesses:
 THOS. B. WINANS,
 WM. J. RIGG.